June 10, 1958  G. HUNRATH  2,838,589
THERMOCOUPLE JUNCTION
Filed April 28, 1953

INVENTOR,
GEORGE HUNRATH
BY
Harry M. Saragovitz
ATTORNEY.

United States Patent Office 2,838,589
Patented June 10, 1958

2,838,589

THERMOCOUPLE JUNCTION

George Hunrath, Red Bank, N. J., assignor to the United States of America as represented by the Secretary of the Army Application April 28, 1953, Serial No. 351,758

1 Claim. (Cl. 136—4)

(Granted under Title 35, U. S. Code (1952), sec. 266)

The invention described herein may be manufactured and used by or for the Government for governmental purposes, without the payment of any royalty thereon.

This invention relates to thermoelectric generators and more particularly to a method of constructing a junction between zinc-antimony and constantan.

Many attempts have been made to form a stable low resistance junction between a zinc-antimony alloy and constantan. Such a junction has been particularly investigated for use in a thermoelectric generator but the results of these investigations have been impracticable due to the fact that the junction has been poorly made and eventually deteriorates. In addition, various solders and soldering fluxes have been tried without any appreciable success. Even soldering these alloys in protective atmospheres or in vacuo does not provide satisfactory junctions.

It is, therefore, an object of the present invention to provide a method for constructing a joint between zinc-antimony and constantan which is strong mechanically and does not deteriorate with time.

In accordance with the present invention, there is provided a method of constructing a joint between a zinc-antimony element and a constantan element comprising intimately uniting said elements to form a junction therebetween, and applying molten metal to said junction.

Also, in accordance with the present invention, there is provided a method of constructing a joint between a zinc-antimony element and a constantan element comprising applying a molten readily solderable metal to the ends of said elements and soldering said ends to each other thereby joining said elements.

Figure 1:
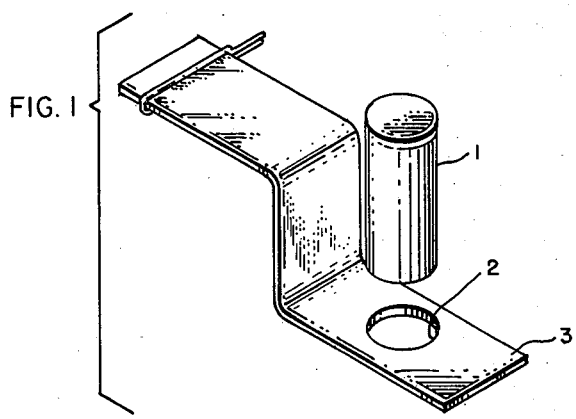
Figure 2:
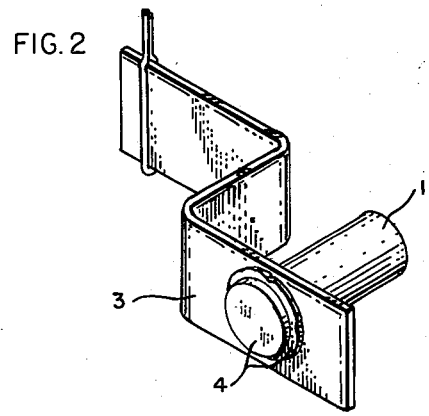

For a better understanding of the invention, together with other and further objects thereof, reference is had to the following description in conjunction with the accompanying drawing in which Figure 1 shows in perspective view the generator according to the invention in exploded form, and Figure 2, shows in perspective view the same generator in assembled form.

It has been found that zinc-antimony elements can be bonded to constantan strips by means of a constantan metal spray. In carrying out the present invention, a cylindrical ingot 1 about ½ inch in diameter is forced through a hole 2 of the same size punched into a strip 3 of constantan, the ingot 1 protruding about 1/16 inch on one side. The constantan and slightly extended zinc-antimony surface is sandblasted or thoroughly cleaned by other suitable methods and is then sprayed with molten constantan 4 by means of a spray gun or other suitable means. It is necessary that the molten constantan be below the melting point of the zinc-antimony upon striking it or the joint formed between the zinc-antimony and the constantan will break easily or oxidize. The mechanical strength of a joint made by means of this metal spraying technique is excellent. It is not necessary that the bonding metal be constantan and other suitable metals such as copper may be used.

Another method of achieving the desired junction between constantan and zinc-antimony is to spray a molten metal that will readily take solder over the ends of the zinc-antimony and constantan elements and then solder the sprayed ends together thereby joining the elements.

While there have been described what is at present considered to be the preferred embodiments of the invention, it will be obvious to those skilled in the art that various changes and modifications may be made therein without departing from the invention and it is, therefore, aimed in the appended claim to cover all such changes and modifications as fall within the true spirit and scope of the invention.

What is claimed:

A thermoelectric generator comprising a cylindrical ingot of zinc-antimony alloy and a strip of constantan, said cylindrical ingot being force fitted through a hole in the constantan strip, said ingot protruding slightly on one side of said constantan strip, said slightly protruding end of the zinc-antimony ingot being joined to the constantan strip by a sprayed metal selected from the group consisting of constantan and copper.

References Cited in the file of this patent

UNITED STATES PATENTS

| | | |
|---|---|---|
| 1,197,168 | Ziegler | Sept. 5, 1916 |
| 2,005,897 | Knowles | June 25, 1935 |
| 2,249,723 | Orr | July 15, 1941 |
| 2,466,175 | Kretsch et al. | Apr. 5, 1949 |
| 2,644,851 | Tapke | July 7, 1953 |

OTHER REFERENCES

American Machinist, July 28, 1949, page 82.